US010242678B2

(12) United States Patent
Shi et al.

(10) Patent No.: US 10,242,678 B2
(45) Date of Patent: Mar. 26, 2019

(54) FRIEND ADDITION USING VOICEPRINT ANALYSIS METHOD, DEVICE AND MEDIUM

(71) Applicant: Beijing Xiaomi Mobile Software Co., Ltd., Haidian District, Beijing (CN)

(72) Inventors: Dalong Shi, Beijing (CN); Wei Liu, Beijing (CN); Chao Sun, Beijing (CN)

(73) Assignee: BEIJING XIAOMI MOBILE SOFTWARE CO., LTD., Haidian District, Beijing (CN)

(*) Notice: Subject to any disclaimer, the term of this patent is extended or adjusted under 35 U.S.C. 154(b) by 0 days.

(21) Appl. No.: 15/616,940

(22) Filed: Jun. 8, 2017

(65) Prior Publication Data

US 2018/0061423 A1 Mar. 1, 2018

(30) Foreign Application Priority Data

Aug. 26, 2016 (CN) .......................... 2016 1 0743903

(51) Int. Cl.
G06Q 50/00 (2012.01)
G10L 17/00 (2013.01)
G10L 17/06 (2013.01)
G10L 17/22 (2013.01)
G10L 17/24 (2013.01)

(52) U.S. Cl.
CPC .............. *G10L 17/22* (2013.01); *G10L 17/00* (2013.01); *G10L 17/005* (2013.01); *G10L 17/06* (2013.01); *G06Q 50/01* (2013.01); *G10L 17/24* (2013.01); *H04M 2201/41* (2013.01)

(58) Field of Classification Search
CPC ....... G10L 17/005; G10L 17/22; G10L 17/24; G07C 9/00071; H04L 61/1594; G06Q 50/01
USPC .......................................... 704/246, 273–274
See application file for complete search history.

(56) References Cited

U.S. PATENT DOCUMENTS 5,247,497 A * 9/1993 Cohn .................... H04M 3/382
369/26.01
6,681,205 B1 1/2004 San Martin et al.
6,961,414 B2 * 11/2005 Inon .................... H04M 3/4931
379/201.02
8,533,485 B1 * 9/2013 Bansal .................... H04L 63/08
380/243

(Continued)

FOREIGN PATENT DOCUMENTS

CN 104394255 A 3/2015
CN 104735634 A 6/2015

(Continued)

OTHER PUBLICATIONS

Supplementary European Search Report in European application No. 17187990.1, dated Feb. 7, 2018.

(Continued)

*Primary Examiner* — James S Wozniak
(74) *Attorney, Agent, or Firm* — Jun He Law Offices P.C.; James J. Zhu

(57) ABSTRACT

A friend addition method, device and medium are provided. The method includes: when a voiceprint-based friend addition request is received, target voice information is acquired; user information of a user to be added is determined according to the target voice information; and the user to be added is added as a friend according to the user information.

5 Claims, 11 Drawing Sheets

(56) References Cited

U.S. PATENT DOCUMENTS

| | | | | |
|---|---|---|---|---|
| 9,027,105 B1* | 5/2015 | Saylor | H04L 63/08 707/705 |
| 9,444,565 B1* | 9/2016 | Leopardi | H04R 3/12 |
| 9,854,418 B1* | 12/2017 | Liu | H04W 4/206 |
| 2003/0125944 A1 | 7/2003 | Wohlsen | |
| 2004/0162726 A1* | 8/2004 | Chang | G10L 17/22 704/247 |
| 2009/0319288 A1* | 12/2009 | Slaney | G06Q 10/10 705/1.1 |
| 2010/0115114 A1* | 5/2010 | Headley | G06F 21/32 709/229 |
| 2010/0325218 A1* | 12/2010 | Castro | G06Q 10/10 709/206 |
| 2012/0079579 A1* | 3/2012 | Kamakura | G06F 21/32 726/7 |
| 2013/0132091 A1* | 5/2013 | Skerpac | G10L 17/005 704/273 |
| 2013/0212173 A1* | 8/2013 | Carthcart | G06Q 50/01 709/204 |
| 2013/0244623 A1* | 9/2013 | Cudak | H04M 3/42 455/414.1 |
| 2013/0275192 A1* | 10/2013 | Aissa | G06Q 30/0213 705/14.15 |
| 2013/0318085 A1* | 11/2013 | Pepper | G06Q 10/10 707/737 |
| 2014/0029041 A1* | 1/2014 | Okubo | H04N 1/4433 358/1.14 |
| 2014/0106710 A1* | 4/2014 | Rodriguez | H04M 1/7253 455/411 |
| 2014/0165178 A1* | 6/2014 | Perrone, II | H04L 63/0892 726/9 |
| 2014/0330563 A1* | 11/2014 | Faians | G10L 17/04 704/236 |
| 2015/0003599 A1 | 1/2015 | Brunn et al. | |
| 2015/0006568 A1 | 1/2015 | Brunn et al. | |
| 2015/0058016 A1* | 2/2015 | Goldstein | G06F 17/30743 704/246 |
| 2015/0098556 A1 | 4/2015 | Mathur et al. | |
| 2015/0099469 A1* | 4/2015 | Goldstein | H04L 67/24 455/41.2 |
| 2016/0111085 A1 | 4/2016 | Brunn et al. | |
| 2016/0134736 A1 | 5/2016 | Brunn et al. | |
| 2016/0260435 A1 | 9/2016 | Baard et al. | |
| 2016/0267284 A1* | 9/2016 | Willis | G06F 21/6218 |
| 2016/0301787 A1 | 10/2016 | Brunn et al. | |
| 2016/0307574 A1* | 10/2016 | Roblek | G10L 17/24 |
| 2016/0330199 A1* | 11/2016 | Weiner | H04L 63/0853 |
| 2016/0343235 A1* | 11/2016 | Belvin | G08B 21/24 |
| 2017/0063825 A1* | 3/2017 | Jeong | H04L 63/08 |
| 2018/0013718 A1* | 1/2018 | Xu | H04L 61/1594 |

FOREIGN PATENT DOCUMENTS

| | | | | |
|---|---|---|---|---|
| CN | 104980339 A | | 10/2015 | |
| CN | 105704319 A | | 6/2016 | |
| CN | 105893554 A | | 8/2016 | |
| CN | 106710593 A | * | 5/2017 | G10L 15/22 |
| WO | 2006130958 A1 | | 12/2006 | |
| WO | 2015150867 A1 | | 10/2015 | |

OTHER PUBLICATIONS

The First Office Action in Chinese application No. 201610743903.8, dated Oct. 10, 2018.

* cited by examiner

FRIEND ADDITION USING VOICEPRINT ANALYSIS METHOD, DEVICE AND MEDIUM

CROSS-REFERENCE TO RELATED APPLICATIONS

This application is filed based upon and claims priority to Chinese Patent Application No. 201610743903.8, filed on Aug. 26, 2016, the entire contents of which are incorporated herein by reference.

TECHNICAL FIELD

The present disclosure generally relates to communications, and more particularly, to a friend addition method, device and medium.

BACKGROUND

Along with continuous development of a network technology and continuous popularization of various types of terminal equipment, social networks have become more and more important to lives of people, and have even become a part of the lives of the people. In these virtual network spaces, users may manage own friend circles in real lives, so that the social networks become windows for people to acquire information, show themselves and implement marketing promotion. Therefore, how to rapidly increase the number of users to expand friend circles of the users in a social network becomes an important research subject of this field.

SUMMARY

The embodiments of the present disclosure provide a friend addition method and device.

According to a first aspect of the embodiments of the present disclosure, a friend addition method is provided, which is applied to a client. The method includes: when a voiceprint-based friend addition request is received, target voice information is acquired; user information of a user to be added is determined according to the target voice information; and the user to be added is added as a friend according to the user information.

According to a second aspect of the embodiments of the present disclosure, a friend addition device is provided, which is applied to a client, the device including: a processor; and a memory configured to store instructions executable by the processor, wherein the processor is configured to: when a voiceprint-based friend addition request is received, acquire target voice information; determine user information of a user to be added according to the target voice information; and add the user to be added as a friend according to the user information.

According to a third aspect of the embodiments of the present disclosure, a non-transitory computer-readable storage medium having stored therein instructions that, when executed by a processor of a mobile terminal, causes the mobile terminal to perform a friend addition method, and the method includes: when a voiceprint-based friend addition request is received, target voice information is acquired; user information of a user to be added is determined according to the target voice information; and the user to be added is added as a friend according to the user information.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects related to the present disclosure as recited in the appended claims.

The following technical solutions provided by the embodiments of the present disclosure are applicable to any social application program with a friend addition function.

Figure 1:
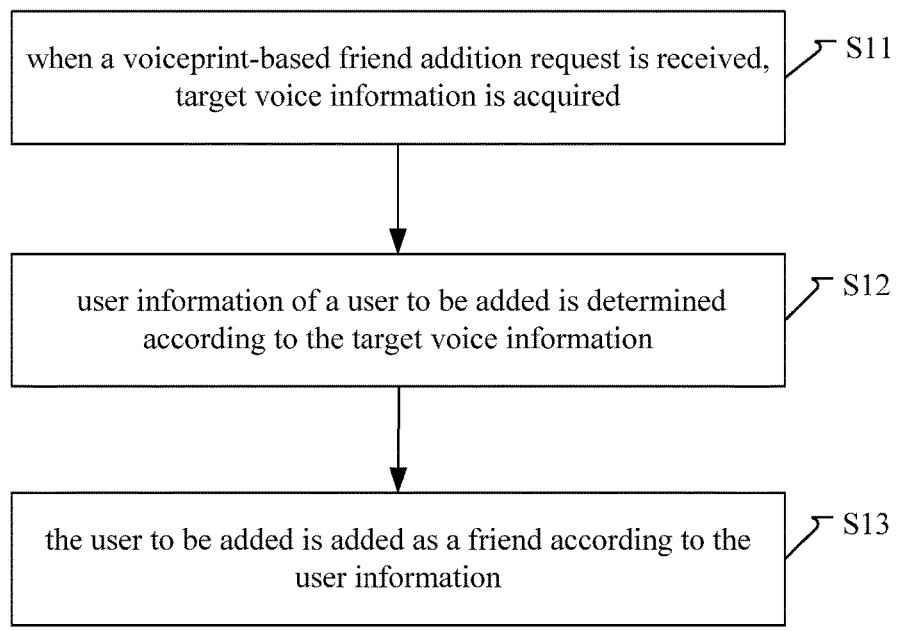
FIG. 1 is a flow chart showing a friend addition method, according to an exemplary embodiment.

FIG. 1 is a flow chart showing a friend addition method, according to an exemplary embodiment, and the friend addition method is applied for a client, wherein the client may be installed in equipment such as a mobile phone, a computer, a digital broadcast terminal, a messaging device, a gaming console, a tablet, a medical device, exercise equipment and a personal digital assistant. As shown in FIG. 1, the method includes the following Step 11 to Step 13.

Step 11: when a voiceprint-based friend addition request is received, target voice information is acquired.

When Step 11 is implemented, a client interface may include a voiceprint-based friend addition option, and when a user clicks the voiceprint-based friend addition option, the client may receive the voiceprint-based friend addition request of the user. Alternatively, the voiceprint-based friend addition request may also be initiated by clicking a preset key or key combination.

Step 12: user information of a user to be added is determined according to the target voice information.

Step 13: the user to be added is added as a friend according to the user information.

Herein, the user information may include at least one of account information registered on the client, a nickname, a portrait and a telephone number. For example, when the user information of the user to be added is the account information, registered on the client, of the user to be added, the client adds the user to be added as the friend according to the account information of the user to be added.

With the embodiment of the present disclosure, the target voice information may be acquired when the voiceprint-based friend addition request is received, the user information of the user to be added is determined according to the target voice information, and then the user to be added is added as the friend according to the user information, so that the friend can be added through a voice. Moreover, such a friend addition process may be implemented only by inputting the voice information without interaction among multiple terminals, so that operations of a user are simplified, the friend addition process is more convenient and faster, and friend addition real-time performance is improved.

Figure 2:
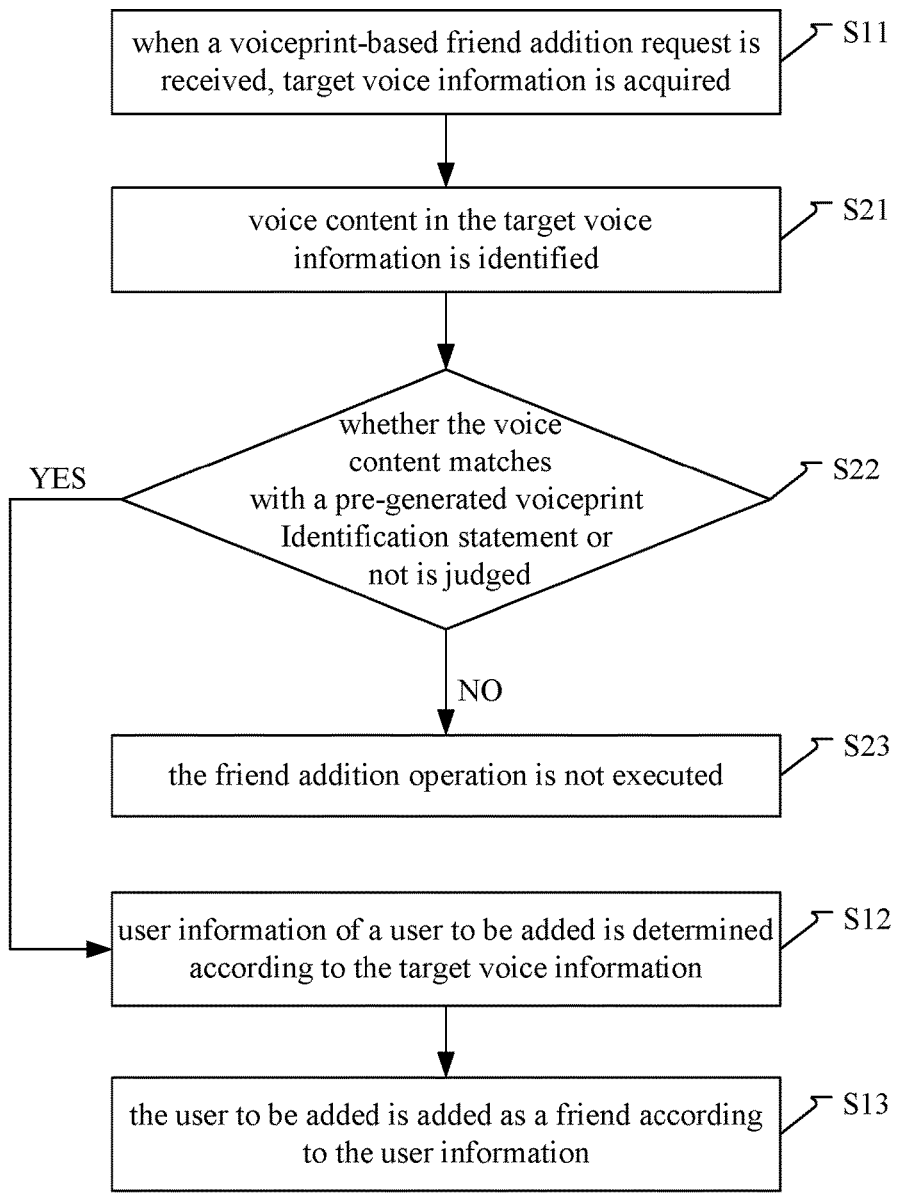
FIG. 2 is a flow chart showing a friend addition method, according to an exemplary embodiment.

In an embodiment, as shown in FIG. 2, after Step 11 is executed, the method further includes the following Step 21 to Step 23.

Step 21: voice content in the target voice information is identified.

In the step, the voice content in the target voice information is identified by adopting a voice identification technology, wherein the voice identification technology will not be elaborated herein.

Step 22: it is judged whether the voice content matches with a pre-generated voiceprint identification statement or not, Step 23 is executed when the voice content does not match with the pre-generated voiceprint identification statement, and Step 12 in the method is continued when the voice content matches with the pre-generated voiceprint identification statement.

For example, when the voice content is the same as the pre-generated voiceprint identification statement, it may be determined that the voice content matches with the pre-generated voiceprint identification statement.

Step 23: the friend addition operation is not executed.

In the embodiment, the voiceprint identification statement is pre-generated by the client. To improve voice-based friend addition security, a voiceprint identification statement may be generated every time when a voiceprint-based friend addition request is received, so that the generated voiceprint identification statement is real-time and unique.

After the voiceprint-based friend addition request is received, the client may randomly generate the voiceprint identification statement according to at least one of current time, current position information and a preset statement.

The preset statement may include at least one of a letter, a word and a sentence, the user may freely edit the preset statement in the client. For example, the preset statement is "fallen blossoms fertilize those in full bloom" and "spring mud".

For example, if the current time is 10:00 am, the voiceprint identification statement randomly generated according to the current time is "ten o'clock in the morning"; if current geographical position information is in building A in Haidian District in Beijing, the voiceprint identification statement randomly generated according to the current geographical position information is "building A in Haidian District in Beijing"; when the voiceprint identification statement is generated by combining the current time and the current geographical position information, the generated voiceprint identification statement may be "building A in Haidian District in Beijing at ten o'clock in the morning"; when the voiceprint identification statement is generated by combining the current geographical position information and the preset statement, the generated voiceprint identification statement may be "building A in Haidian District in Beijing, fallen blossoms fertilize those in full bloom", wherein "fallen blossoms fertilize those in full bloom" is the preset statement; and the like.

In the embodiment, it is judged whether the voice content in the target voice information matches with the pre-generated voiceprint identification statement or not. If NO, the friend addition operation is not executed, so that the addition of a wrong user due to acquisition of wrong voice information is avoided, and friend addition accuracy is further improved.

Figure 3:
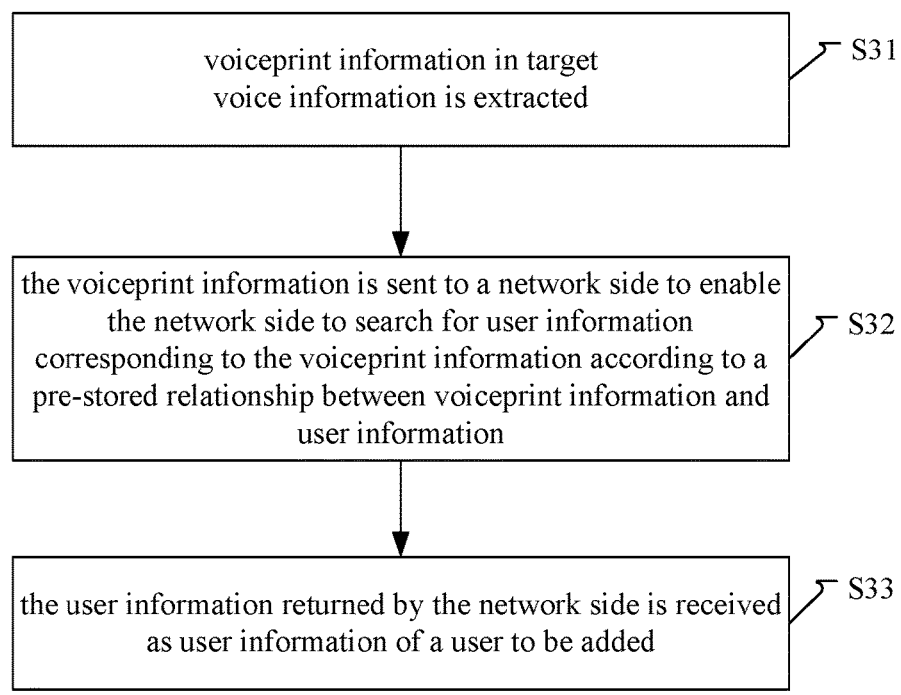
FIG. 3 is a flow chart showing Step 12 in a friend addition method, according to an exemplary embodiment.

In an embodiment, Step 12 may be executed as Step 31 to Step 33 shown in FIG. 3.

Step 31: voiceprint information in the target voice information is extracted.

In the step, the target voice information may be identified to further identify the voiceprint information in the target voice information via a voiceprint identifier installed in a terminal; and the target voice information may also be identified to further identify the voiceprint information in the target voice information via a voiceprint identification server located on a network side. The client is required to interact with the voiceprint identification server at this moment. The client sends the target voice information to the voiceprint identification server, and the voiceprint identification server feeds back the voiceprint information in the target voice information to the client after identifying the voiceprint information in the target voice information. Thus, the voiceprint information in the target voice information is obtained.

Step 32: the voiceprint information is sent to a network side to enable the network side to search for user information corresponding to the voiceprint information according to a pre-stored relationship between voiceprint information and user information.

Step 33: the user information returned by the network side is received as the user information of the user to be added.

In the embodiment, the voiceprint information in the target voice information is extracted, the user information corresponding to the voiceprint information is found from the network side, and the user to be added is further added as the friend according to the found user information, so that the friend can be added through the voice, a manual operation process of the user is eliminated, and convenience is brought to friend addition of the user.

In the embodiment, the network side pre-stores the relationship between the voiceprint information and the user information, but it may not be ensured that voiceprint information of all users is stored in the network side, so that the network side may return prompting information to the client if the voiceprint information in the target voice information is not found in the pre-stored relationship between the voiceprint information and the user information after the voiceprint information is sent to the network side. The client receives and outputs the prompting information returned by the network side, and the prompting information indicates that the network side does not store the voiceprint information. For example, the prompting information may be "it failed to add the user by voiceprint identification, please select another manner for addition" or "the current voiceprint information is invalid".

Figure 4:
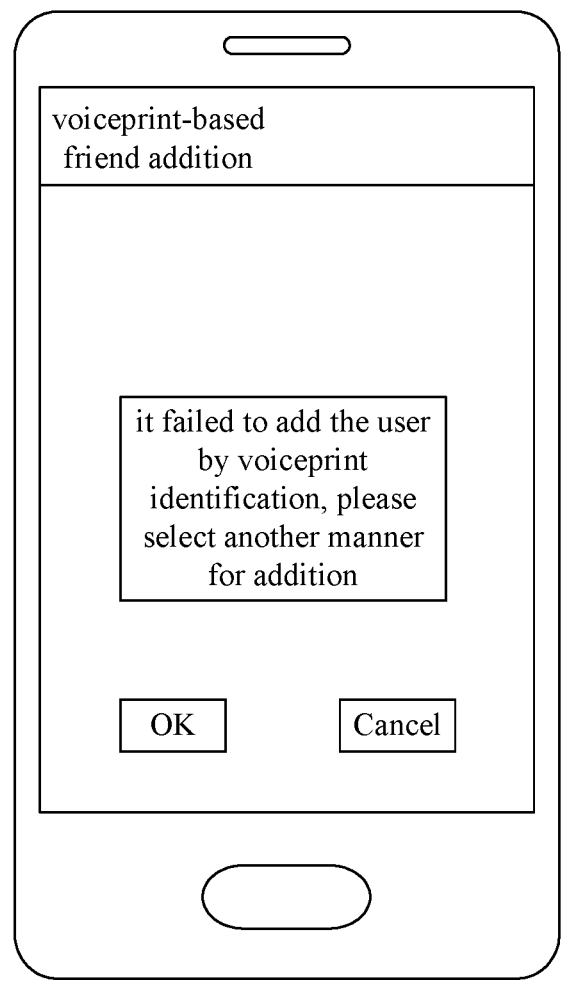
FIG. 4 is an interface display diagram of a client in a friend addition method, according to an exemplary embodiment.

FIG. 4 is a schematic diagram illustrating an interface for outputting prompting information by a client, according to an embodiment. The prompting information "it failed to add the user by voiceprint identification, please select another manner for addition" is displayed on the interface. At this moment, the user may select another manner to add the friend according to the prompting information, such as a two-dimensional code scanning manner and a user information direct inputting manner. The interface shown in FIG. 4 also includes options "OK" and "cancel", the client jumps to a friend addition manner selection interface when the user clicks option "OK", and the client cancels friend addition of this time when the user clicks option "cancel".

In the embodiment, the prompting information indicates that the network side does not store the voiceprint information, and the prompting information returned by the network side is received and output, so that the user may timely know why the friend may not be added through the voice, and may add the friend in another manner, and user experiences are improved.

Figure 5:
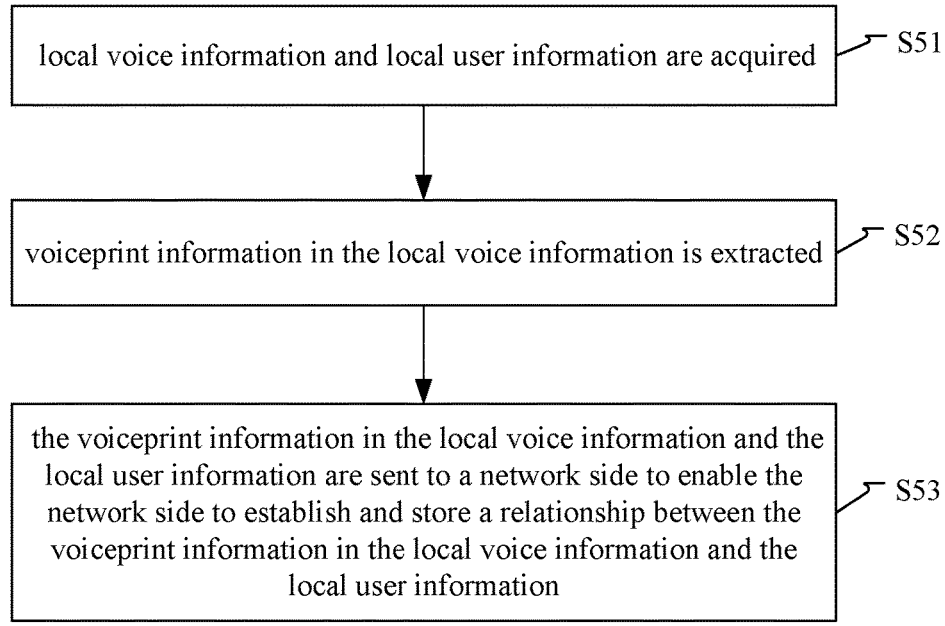
FIG. 5 is a flow chart showing a friend addition method, according to an exemplary embodiment.

In an embodiment, the client may also establish the relationship between the voiceprint information and the user information by Step 51 to Step 53 shown in FIG. 5.

Step 51: local voice information and local user information are acquired.

Herein, the local voice information may be obtained by inputting voice information on the client by the user, and the local user information may be manually input on the client by the user.

Step 52: voiceprint information in the local voice information is extracted.

In the step, the local voice information may be identified to further identify the voiceprint information in the local voice information by the voiceprint identifier installed in the terminal. Alternatively, the local voice information is identified to further identify the voiceprint information in the local voice information via the voiceprint identification server located on the network side. The client is required to interact with the voiceprint identification server at this moment. The client sends the local voice information to the voiceprint identification server at first, and the voiceprint identification server feeds back the voiceprint information in the local voice information to the client after identifying the voiceprint information in the local voice information. Then, the voiceprint information in the local voice information is obtained.

Step 53: the voiceprint information in the local voice information and the local user information are sent to the network side to enable the network side to establish and store a relationship between the voiceprint information in the local voice information and the local user information.

In the embodiment, the voiceprint information in the local voice information and the local user information are correspondingly stored on the network side, and then the client may find the user information corresponding to the voiceprint information from the network side when adding the friend according to the voice, and may further add the friend according to the user information, so that the friend can be added by voiceprint identification.

Figure 6:
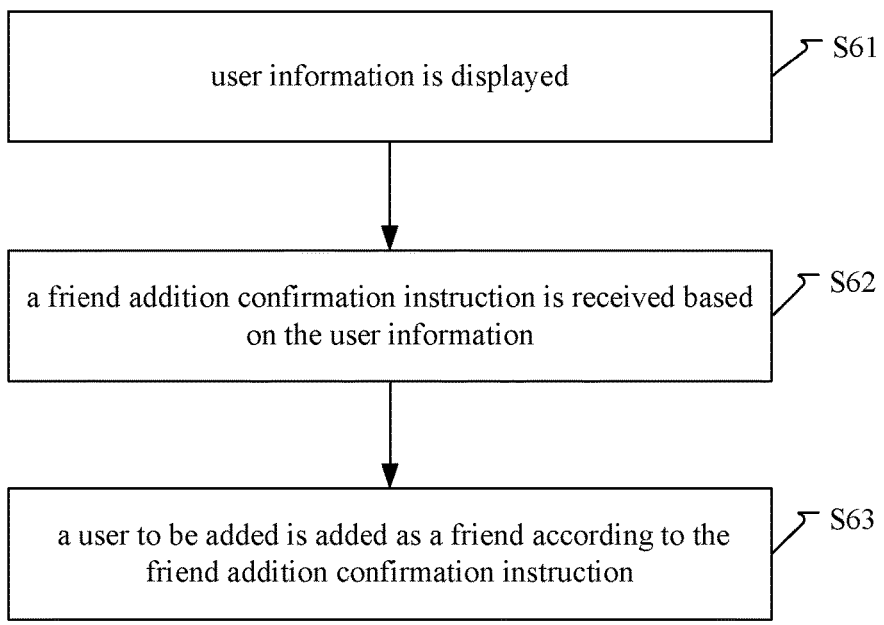
FIG. 6 is a flow chart showing Step 13 in a friend addition method, according to an exemplary embodiment.

In an embodiment, Step 13 may be executed as Step 61 to Step 63 shown in FIG. 6.

Step 61: the user information is displayed.

Step 62: a friend addition confirmation instruction is received based on the user information.

Step 63: the user to be added is added as the friend according to the friend addition confirmation instruction.

In the embodiment, the user information is displayed, and the user to be added is added when the friend addition confirmation instruction is received based on the user information, so that the addition of a wrong friend due to wrong user information is avoided, and accuracy of adding the friend through the voice is ensured.

Figure 7:
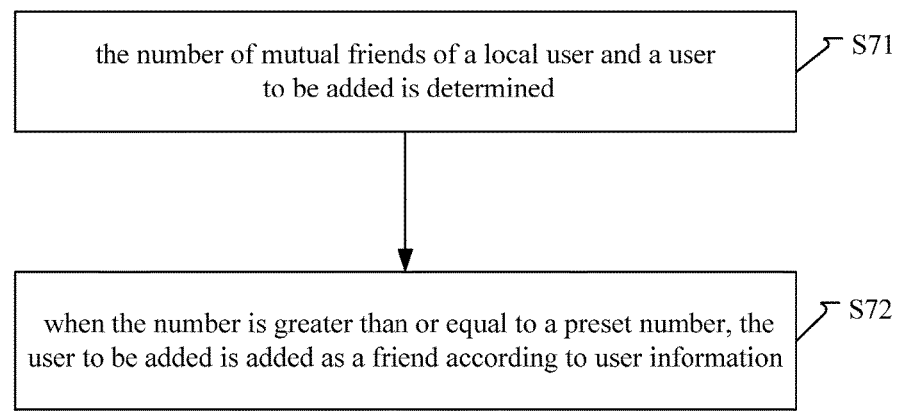
FIG. 7 is a flow chart showing Step 13 in a friend addition method, according to an exemplary embodiment.

In an embodiment, Step 13 may further be executed as Step 71 to Step 72 shown in FIG. 7.

Step 71: the number of mutual friends of a local user and the user to be added is determined.

Step 72: when the number is greater than or equal to a preset number, the user to be added is added as the friend according to the user information.

For example, if the preset number is 5, when the number of the mutual friends of the local user and the user to be added reaches 5 or more than 5, the client automatically adds the user to be added as the friend according to the user information. At this moment, it does not need to wait for the friend addition confirmation instruction sent by the user.

In the embodiment, the number of the mutual friends of the local user and the user to be added may be determined, and when the number is greater than or equal to the preset number, the user to be added is automatically added as the friend, so that the friend may be automatically added through the voice, many manual operations of the user are eliminated, and the user experiences are further improved.

The friend addition method provided by the present disclosure will be described below with reference to an embodiment.

Figure 8:
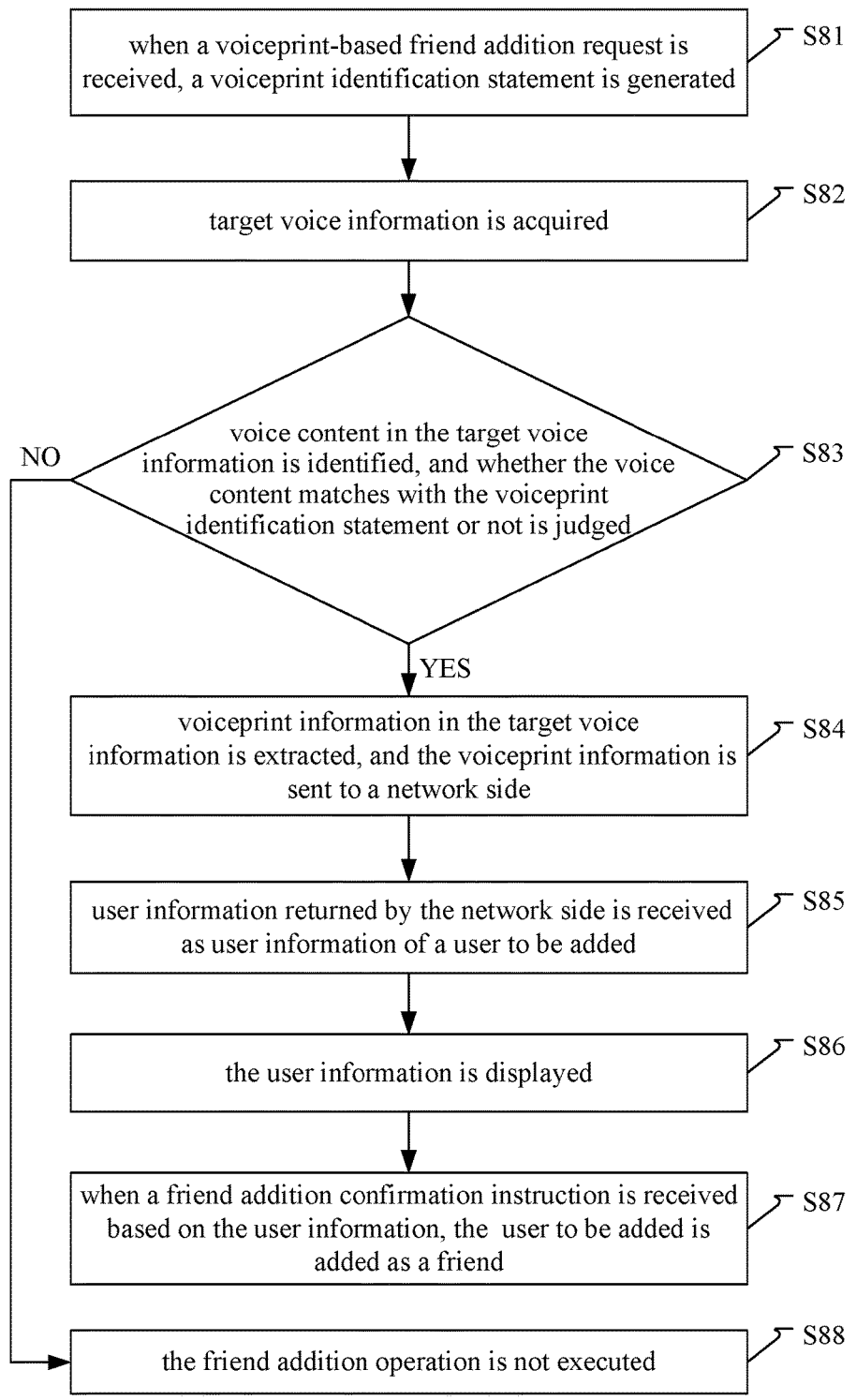
FIG. 8 is a flow chart showing a friend addition method, according to an embodiment.

FIG. 8 is a flow chart showing a friend addition method, according to an embodiment. As shown in FIG. 8, the method is configured for a client, and includes the following Step 81 to Step 88.

Step 81: when a voiceprint-based friend addition request is received, a voiceprint identification statement is generated, wherein the client may randomly generate the voiceprint identification statement according to at least one of current time, current position information and a preset statement.

Step 82: target voice information is acquired.

Step 83: voice content in the target voice information is identified, and it is judged whether the voice content matches with the voiceprint identification statement or not. Step 84 is executed when the voice content matches with the voiceprint identification statement, and Step 88 is executed when the voice content does not match with the voiceprint identification statement.

Step 84: voiceprint information in the target voice information is extracted, and the voiceprint information is sent to a network side, wherein the network side searches for user information corresponding to the voiceprint information from a pre-stored relationship between voiceprint information and user information after receiving the voiceprint information, and sends the found user information to the client.

Step 85: the user information returned by the network side is received as user information of a user to be added.

Step 86: the user information is displayed.

Step 87: when a friend addition confirmation instruction is received based on the user information, the user to be added is added as a friend.

Step 88: the friend addition operation is not executed.

With the embodiment of the present disclosure, the target voice information may be acquired when the voiceprint-based friend addition request is received, the user information of the user to be added is determined according to the target voice information, and then the user to be added is added as the friend according to the user information, so that the friend can be added through a voice. Moreover, such a friend addition process may be implemented only by inputting the voice information without interaction among multiple terminals, so that operations of a user are simplified, the friend addition process is more convenient and faster, and friend addition real-time performance is improved.

A device embodiment of the present disclosure is described below, and may be configured to execute the method embodiment of the present disclosure.

Figure 9:
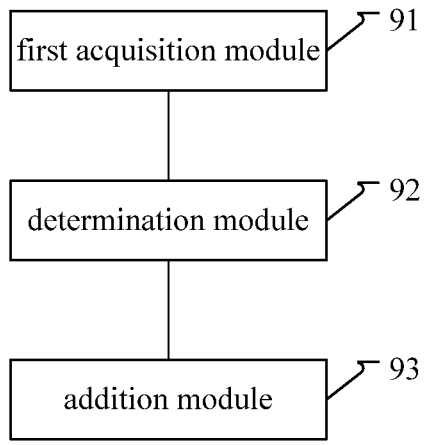
FIG. 9 is a block diagram illustrating a friend addition device, according to an exemplary embodiment.

FIG. 9 is a block diagram illustrating a friend addition device, according to an exemplary embodiment, and the device may be implemented in software, hardware or a combination thereof as part or all of electronic equipment. Referring to FIG. 9, the friend addition device is applied to a client, and includes a first acquisition module 91, a determination module 92 and an addition module 93.

The first acquisition module 91 is configured to, when a voiceprint-based friend addition request is received, acquire target voice information.

A client interface may include a voiceprint-based friend addition option, and when a user clicks the voiceprint-based friend addition option, the first acquisition module 91 may receive the voiceprint-based friend addition request of the user. Alternatively, the voiceprint-based friend addition request may also be initiated by clicking a preset key or key combination.

The determination module 92 is configured to determine user information of a user to be added according to the target voice information.

The addition module 93 is configured to add the user to be added as a friend according to the user information.

Herein, the user information may include at least one of account information registered on the client, a nickname, a portrait and a telephone number. For example, when the user information of the user to be added is the account information, registered on the client, of the user to be added, the addition module 93 adds the user to be added as the friend according to the account information of the user to be added.

With the device provided by the embodiment of the present disclosure, the first acquisition module 91 may acquire the target voice information when the voiceprint-based friend addition request is received, the determination module 92 determines the user information of the user to be added according to the target voice information, and then the addition module 93 adds the user to be added as the friend according to the user information, so that the friend can be added through a voice. Moreover, such a friend addition process may be implemented only by inputting the voice information without interaction among multiple terminals, so that operations of a user are simplified, the friend addition process is more convenient and faster, and friend addition real-time performance is improved.

Figure 10:
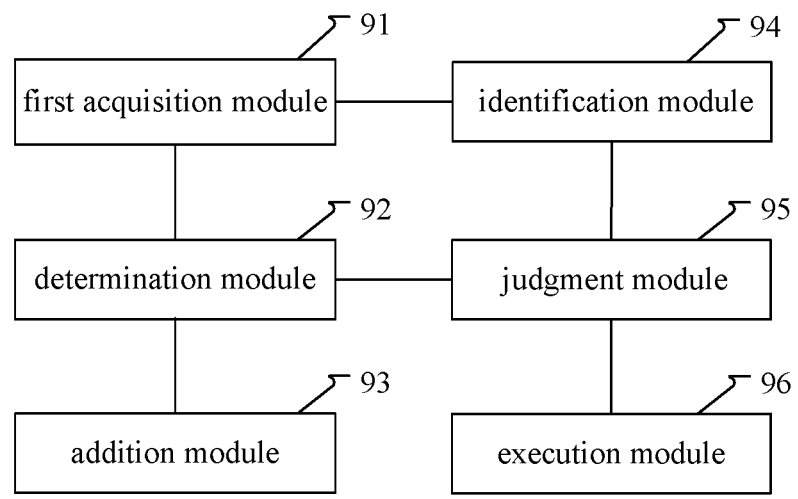
FIG. 10 is a block diagram illustrating a friend addition device, according to an exemplary embodiment.

In an embodiment, as shown in FIG. 10, the device further includes: an identification module 94, configured to identify voice content in the target voice information;

a judgment module 95, configured to judge whether the voice content matches with a pre-generated voiceprint identification statement or not, wherein, for example, when the voice content matches with the pre-generated voiceprint identification statement, it may be determined that the voice content matches with the pre-generated voiceprint identification statement; and an execution module 96, configured to, when the voice content does not match with the pre-generated voiceprint identification statement, not execute the friend addition operation.

In the embodiment, the voiceprint identification statement is pre-generated by the client. To improve voice-based friend addition security, a voiceprint identification statement may be generated every time when a voiceprint-based friend addition request is received, so that the generated voiceprint identification statement is real-time and unique.

After the voiceprint-based friend addition request is received, the client may randomly generate the voiceprint identification statement according to at least one of current time, current position information and a preset statement. The preset statement may include at least one of a letter, a word and a sentence, the user may freely edit the preset statement in the client, and for example, the preset statement is "fallen blossoms fertilize those in full bloom" and "spring mud".

For example, if the current time is 10:00 am, the voiceprint identification statement randomly generated according to the current time is "ten o'clock in the morning"; if current geographical position information is in building A in Haidian District in Beijing, the voiceprint identification statement randomly generated according to the current geographical position information is "building A in Haidian District in Beijing"; when the voiceprint identification statement is generated by combining the current time and the current geographical position information, the generated voiceprint identification statement may be "building A in Haidian District in Beijing at ten o'clock in the morning"; when the voiceprint identification statement is generated by combining the current geographical position information and the preset statement, the generated voiceprint identification statement may be "building A in Haidian District in Beijing, fallen blossoms fertilize those in full bloom", wherein "fallen blossoms fertilize those in full bloom" is the preset statement; and the like.

In the embodiment, the judgment module 95 judges whether the voice content in the target voice information matches with the pre-generated voiceprint identification statement or not, and if NO, the friend addition operation is not executed, so that the addition of a wrong user due to acquisition of wrong voice information is avoided, and friend addition accuracy is further improved.

Figure 11:
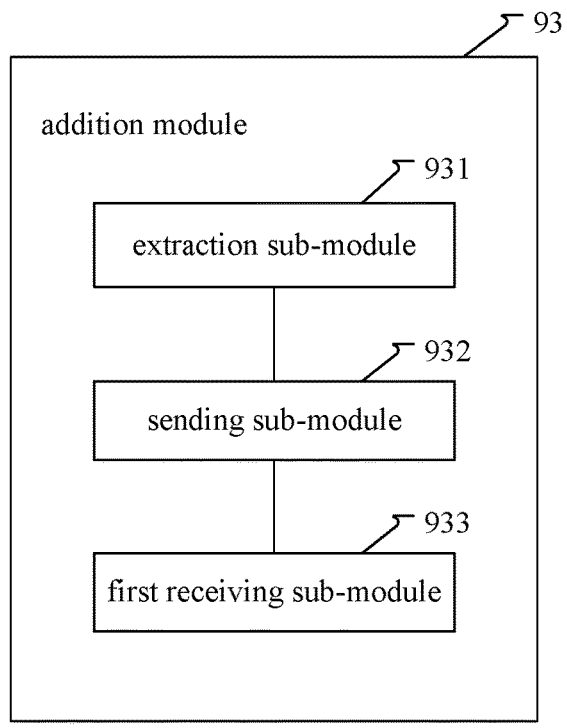
FIG. 11 is a block diagram illustrating an addition module in a friend addition device, according to an exemplary embodiment.

In an embodiment, as shown in FIG. 11, the addition module 93 includes:

an extraction sub-module 931, configured to extract voiceprint information in the target voice information, wherein the extraction sub-module 931 may identify the target voice information to further identify the voiceprint information in the target voice information via a voiceprint identifier installed in a terminal, the extraction sub-module 931 may also identify the target voice information to further identify the voiceprint information in the target voice information via a voiceprint identification server located on a network side, the extraction sub-module 931 is required to interact with the voiceprint identification server at this moment, the extraction sub-module 931 sends the target voice information to the voiceprint identification server at first, the voiceprint identification server feeds back the voiceprint information in the target voice information to the extraction sub-module 931 after identifying the voiceprint information in the target voice information, and then the voiceprint information in the target voice information is obtained;

a sending sub-module 932, configured to send the voiceprint information to a network side to enable the network side to search user information corresponding to the voiceprint information according to a pre-stored relationship between voiceprint information and user information; and a first receiving sub-module 933, configured to receive the user information returned by the network side as the user information of the user to be added.

In the embodiment, the extraction sub-module 931 extracts the voiceprint information in the target voice information, the user information corresponding to the voiceprint information is searched from the network side, and the user to be added is further added as the friend according to the found user information, so that the friend can be added through the voice, a manual operation process of the user is eliminated, and convenience is brought to friend addition of the user.

In an embodiment, the device further includes:

an output module, configured to, after the voiceprint information is sent to the network side, receive and output prompting information returned by the network side, the prompting information indicating that the network side does not store the voiceprint information.

For example, the prompting information is "it failed to add the user by voiceprint identification, please select another manner for addition" or "the current voiceprint information is invalid".

In the embodiment, the output module receives and outputs the prompting information, configured to prompt the user that the network side does not store the voiceprint information, returned by the network side is received and output, so that the user may timely know why the friend may not be added through the voice, and may add the friend in another manner, and user experiences are improved.

Figure 12:
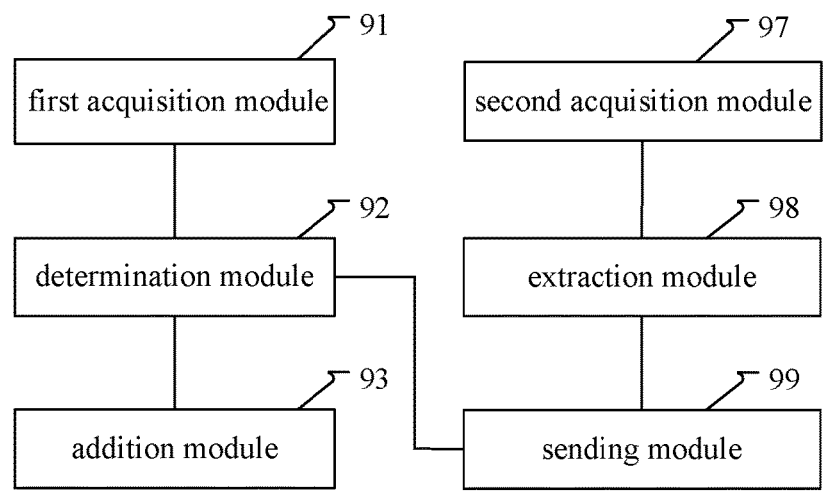
FIG. 12 is a block diagram illustrating a friend addition device, according to an exemplary embodiment.

In an embodiment, as shown in FIG. 12, the device further includes:

a second acquisition module 97, configured to acquire local voice information and local user information, wherein the local voice information may be obtained by inputting voice information on the client by the user, and the local user information may be manually input on the client by the user;

an extraction module 98, configured to extract voiceprint information in the local voice information, wherein, in the step, the extraction module 98 may identify the local voice information to further identify the voiceprint information in the local voice information by the voiceprint identifier installed in the terminal, or, the extraction module 98 identifies the local voice information to further identify the voiceprint information in the local voice information via the voiceprint identification server located on the network side, the extraction module 98 is required to interact with the voiceprint identification server at this moment, the extraction module 98 sends the local voice information to the voiceprint identification server at first, the voiceprint identification server feeds back the voiceprint information in the local voice information to the extraction module 98 after identifying the voiceprint information in the local voice information, and then the voiceprint information in the local voice information is obtained; and a sending module 99, configured to send the voiceprint information in the local voice information and the local user information to the network side to enable the network side to establish and store a relationship between the voiceprint information in the local voice information and the local user information.

In the embodiment, the voiceprint information in the local voice information and the local user information are correspondingly stored on the network side, and then the client may find the user information corresponding to the voiceprint information from the network side when adding the friend according to the voice, and may further add the friend according to the user information, so that the friend can be added by voiceprint identification.

Figure 13:
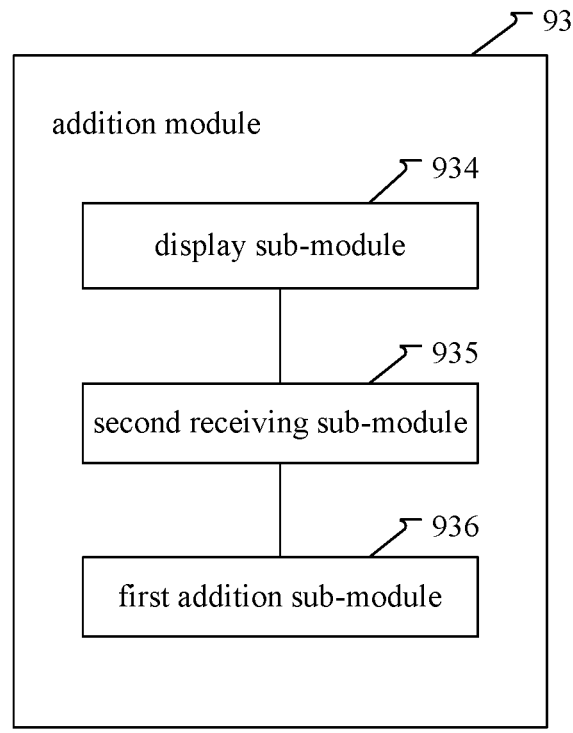
FIG. 13 is a block diagram illustrating an addition module in a friend addition device, according to an exemplary embodiment.

In an embodiment, as shown in FIG. 13, the addition module 93 includes:

a display sub-module 934, configured to display the user information;

a second receiving sub-module 935, configured to receive a friend addition confirmation instruction based on the user information; and a first addition sub-module 936, configured to add the user to be added as the friend according to the friend addition confirmation instruction.

In the embodiment, the user information is displayed, and the user to be added is added when the friend addition confirmation instruction is received based on the user information, so that the addition of a wrong friend due to wrong user information is avoided, and accuracy of adding the friend through the voice is ensured.

Figure 14:
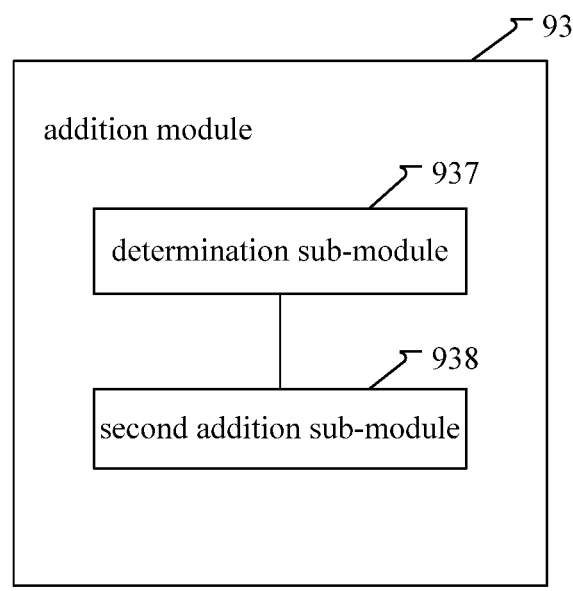
FIG. 14 is a block diagram illustrating an addition module in a friend addition device, according to an exemplary embodiment.

In an embodiment, as shown in FIG. 14, the addition module 93 includes:

a determination sub-module 937, configured to determine the number of mutual friends of a local user and the user to be added; and a second addition sub-module 938, configured to, when the number is greater than or equal to a preset number, add the user to be added as the friend according to the user information.

For example, if the preset number is 5, when the number of the mutual friends of the local user and the user to be added reaches 5 or more than 5, the client automatically adds the user to be added as the friend according to the user information, and at this moment, it is unnecessary to wait for the friend addition confirmation instruction sent by the user.

In the embodiment, the number of the mutual friends of the local user and the user to be added may be determined, and when the number is greater than or equal to the preset number, the user to be added is automatically added as the friend, so that the friend may be automatically added through the voice, many manual operations of the user are eliminated, and the user experiences are further improved.

In an exemplary embodiment, a friend addition device is provided, which is applied to a client, the device including: a processor; and a memory configured to store instructions executable by the processor, wherein the processor is configured to: when a voiceprint-based friend addition request is received, acquire target voice information; determine user information of a user to be added according to the target voice information; and add the user to be added as a friend according to the user information.

With respect to the devices in the above embodiments, the specific manners for performing operations for individual modules therein have been described in detail in the embodiments regarding the methods, which will not be elaborated herein.

Figure 15:
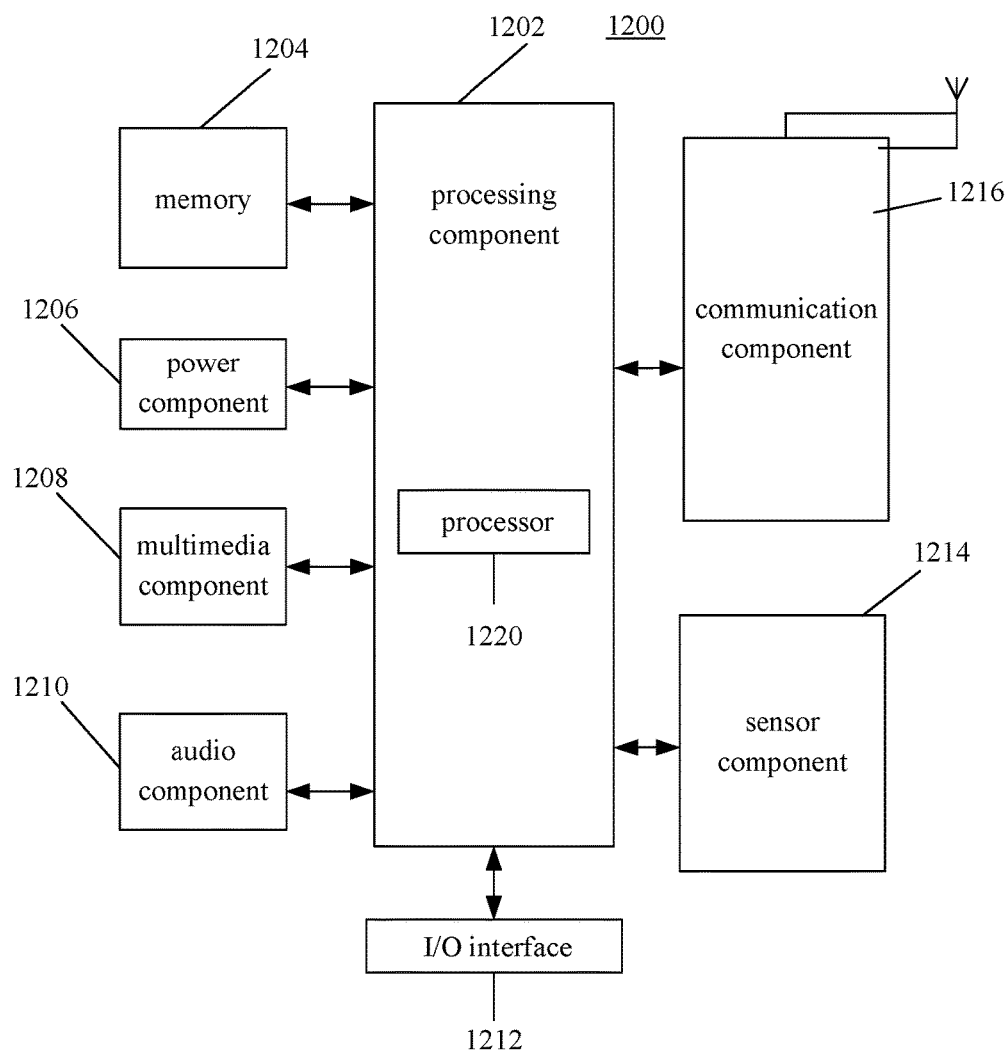
FIG. 15 is a block diagram illustrating a friend addition device, according to an exemplary embodiment.

FIG. 15 is a block diagram illustrating a friend addition device, according to an exemplary embodiment. For example, the device 1200 may be a mobile phone, a computer, a digital broadcast terminal, a messaging device, a gaming console, a tablet, a medical device, exercise equipment, a personal digital assistant and the like.

The device 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the abovementioned methods. Moreover, the processing component 1202 may include one or more modules which facilitate interaction between the processing component 1202 and the other components. For instance, the processing component 1202 may include a multimedia module to facilitate interaction between the multimedia component 1208 and the processing component 1202.

The memory 1204 is configured to store various types of data to support the operation of the device 1200. Examples of such data include instructions for any application programs or methods operated on the device 1200, contact data, phonebook data, messages, pictures, video, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 provides power for various components of the device 1200. The power component 1206 may include a power management system, one or more power supplies, and other components associated with the generation, management and distribution of power for the device 1200.

The multimedia component 1208 includes a screen providing an output interface between the device 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the device 1200 is in the operation mode, such as a call mode, a recording mode and a voice recognition mode. The received audio signal may be further stored in the memory 1204 or sent through the communication component 1216. In some embodiments, the audio component 1210 further includes a speaker configured to output the audio signal.

The I/O interface 1212 provides an interface between the processing component 1202 and a peripheral interface module, and the peripheral interface module may be a keyboard, a click wheel, a button and the like. The button may include, but not limited to: a home button, a volume button, a starting button and a locking button.

The sensor component 1214 includes one or more sensors configured to provide status assessment in various aspects for the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and another device. The device 1200 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 1216 receives a broadcast signal or broadcast associated information from an external broadcast management system through a broadcast channel. In an exemplary embodiment, the communication component 1216 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1204 including an instruction, and the instruction may be executed by the processor 1220 of the device 1200 to implement the abovementioned method. For example, the non-transitory computer-readable storage medium may be a ROM, a Radom Access Memory (RAM), a Compact Disc Read-Only Memory (CD-ROM), a magnetic tape, a floppy disc, an optical data storage device and the like.

According to a non-transitory computer-readable storage medium, when instructions in the storage medium are executed by the processor of the device 1200, the device 1200 may execute the abovementioned friend addition method, and the method includes: when a voiceprint-based friend addition request is received, target voice information is acquired; user information of a user to be added is determined according to the target voice information; and the user to be added is added as a friend according to the user information.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A friend addition device, applied to a client, the device comprising:
   a processor; and
   a memory configured to store instructions executable by the processor,
   wherein the processor is configured to:
     generate a voiceprint identification statement according to at least one of current time, current position information and a preset statement when a voiceprint-based friend addition request is received;
     acquire target voice information;
     identify voice content in the target voice information;
     judge whether the voice content matches with the voiceprint identification statement or not;
     not execute the friend addition operation when the voice content does not match with the voiceprint identification statement;
     determine user information of a user to be added according to the target voice information when the voice content matches with the voiceprint identification statement; and
     add the user to be added as a friend according to the user information,
     wherein determining the user information of the user to be added according to the target voice information comprises:
     extracting voiceprint information in the target voice information;
     sending the voiceprint information to a network side to enable the network side to search for user information corresponding to the voiceprint information according to a pre-stored relationship between voiceprint information and user information; and
     receiving the user information returned by the network side as the user information of the user to be added, and after sending the voiceprint information to the network side, the method further comprising:
     receiving and outputting prompting information returned by the network side, the prompting information indicating that the network side does not store the voiceprint information.

2. The device of claim 1, wherein the processor is further configured to:
   acquire local voice information and local user information;
   extract voiceprint information in the local voice information; and
   send the voiceprint information in the local voice information and the local user information to the network side to enable the network side to establish and store a relationship between the voiceprint information in the local voice information and the local user information.

3. The device of claim 1, wherein the processor configured to add the user to be added as the friend according to the user information is further configured to:
   display the user information;
   receive a friend addition confirmation instruction based on the user information; and
   add the user to be added as the friend according to the friend addition confirmation instruction.

4. The device of claim 1, wherein the processor configured to add the user to be added as the friend according to the user information is further configured to:
   determine a number of mutual friends of a local user and the user to be added; and
   add the user to be added as the friend according to the user information when the number is greater than or equal to a preset number.

5. A non-transitory computer-readable storage medium having stored therein instructions that, when executed by a processor of a mobile terminal, causes the mobile terminal to perform a friend addition method, the method comprising:
   generating a voiceprint identification statement according to at least one of current time, current position information and a preset statement when a voiceprint-based friend addition request is received;
   acquiring target voice information;
   identifying voice content in the target voice information;
   judging whether the voice content matches with the voiceprint identification statement or not;
   not executing the friend addition operation when the voice content does not match with the voiceprint identification statement;
   determining user information of a user to be added according to the target voice information when the voice content matches with the voiceprint identification statement; and
   adding the user to be added as a friend according to the user information,
   wherein determining the user information of the user to be added according to the target voice information comprises:
   extracting voiceprint information in the target voice information;
   sending the voiceprint information to a network side to enable the network side to search for user information corresponding to the voiceprint information according to a pre-stored relationship between voiceprint information and user information; and
   receiving the user information returned by the network side as the user information of the user to be added, and after sending the voiceprint information to the network side, the method further comprising:

receiving and outputting prompting information returned by the network side, the prompting information indicating that the network side does not store the voiceprint information.

\* \* \* \* \*